United States Patent [19]
Sakata et al.

[11] Patent Number: 5,933,693
[45] Date of Patent: Aug. 3, 1999

[54] ELECTROCONDUCTIVE ELASTIC MEMBER AND ELECTROPHOTOGRAPHIC APPARATUS USING SAME

[75] Inventors: Junji Sakata, Fujisawa; Tadashi Nakajima, Tokyo; Takahiro Kawagoe, Tokorozawa, all of Japan

[73] Assignee: Bridgestone Corporation, Tokyo, Japan

[21] Appl. No.: 09/021,400

[22] Filed: Feb. 10, 1998

[30] Foreign Application Priority Data

| Feb. 12, 1997 | [JP] | Japan | 9-027716 |
| Feb. 12, 1997 | [JP] | Japan | 9-027728 |
| Jul. 3, 1997 | [JP] | Japan | 9-178459 |
| Nov. 10, 1997 | [JP] | Japan | 9-306720 |

[51] Int. Cl.$^6$ ............ G03G 15/08; B29D 22/00; B32B 27/00
[52] U.S. Cl. ............ 399/286; 399/279; 428/36.5; 428/425.9
[58] Field of Search ............ 399/279, 286; 430/36.5, 425.9

[56] References Cited

U.S. PATENT DOCUMENTS

| 4,634,633 | 1/1987 | Ninomiya et al. | 428/425.9 |
| 5,656,344 | 8/1997 | Sawa et al. | 428/36.5 |

*Primary Examiner*—Richard Moses
*Assistant Examiner*—Shival Virmani
*Attorney, Agent, or Firm*—Oblon, Spivak, McClelland, Maier & Neustadt, P.C.

[57] ABSTRACT

An electroconductive elastic member including an electroconductive material prepared from a polyurethane foam or polyurethane elastomer using a polyester polyol and a quaternary ammonium salt to impart electroconductivity. The polyurethane foam or polyurethane elastomer can be produced using, as a polyisocyanate component, a hydrogenated product from diphenyl-methane diisocyanate, hexamethylene diisocyanate, or any of various modified diphenylmethane/hexamethylene diisocyanate The elastic member may be used in an electrophotographic apparatus. Thus the member is well suited for producing an elastic roller with intermediate electric resistance in an electrophotographic process.

14 Claims, 1 Drawing Sheet

ELECTROCONDUCTIVE ELASTIC MEMBER AND ELECTROPHOTOGRAPHIC APPARATUS USING SAME

BACKGROUND OF THE INVENTION

1. Field of the Invention

The present invention relates to an electroconductive elastic member and an electrophotographic apparatus using the same. More particularly, the present invention pertains to an electroconductive elastic member which is lessened in not only positional variance of electric resistance but also dependence of electric resistance upon applied voltage as well as in variation range of electric resistance at the time of continuous passage of electric current and variation in electric resistance due to environmental change, and which is well suited as an elastic roller with an intermediate electric-resistance for use in an electrophotographic process; to an electroconductive elastic member which is imparted with an antistatic function such as a packaging member and a shock-absorbing member, or a developing member and an image transfer member that are employed in an electrophotographic mechanism; and to an electrophotographic apparatus using any of the above-mentioned electroconductive elastic members.

2. Description of the Related Arts

In the electrophotographic process including a copying machine, an electrostatic recording apparatus or the like, there has heretofore been generally adopted a copying method which comprises the steps of at first, uniformly electrically charging the surface of a photosensitive body in which is used a photoelectroconductive substance, for example, ZnO, CdS, Se, OPC(organic photoconductor), α-Si and the like; thereafter projecting an image thereonto from an optical system to lower the potential of the part which has been stricken by the light from the optical system, thereby forming a latent image; and subsequently carrying out the adhesion of a toner (development) and transfer of the toner image to a transfer material (recording medium) such as paper.

In the above-mentioned electrophotographic process, intense attention has been paid to an electroconductive elastic member, which is utilized in the form of an elastic roller having an intermediate electric-resistance and the like members. In this elastic roller having an intermediate electric-resistance and the like members, use is usually made of a high molecular elastomer or a high molecular foam such as rubber and polyurethane as a matrix.

The elastic roller having an intermediate electric-resistance which is used for the above-mentioned purpose of application is required not only to possess a prescribed electric-resistance but also to be lessened in positional variance of electric resistance, in dependence of electric resistance upon applied voltage, in variation range of electric resistance at the time of continuous passage of electric current and besides in variation of electric resistance due to change in environmental conditions such as temperature and humidity. In order to meet the aforesaid requirements, therefore, various materials have heretofore been investigated, however none of said materials has sufficiently met the requirements.

In the case of intermixing, for example, carbon black as an electroconductive material in an electroconductive elastic member, the problem still remains unsolved in that it is difficult to keep the electric resistance constant in the intermediate electric-resistance region in the range of 1MΩ to 100GΩ which range is needed for an electrophotographic process. Likewise, a high molecular elastomer, a high molecular foam and the like that are regulated to a prescribed electric resistance by intermixing therein a powder or a whisker of a metal or a metal oxide, or a filler such as carbon black suffer the problems of great positional variance of electric resistance and remarkable dependence of electric resistance upon applied voltage. In order to solve the above-mentioned problems under such circumstances, an attempt is made to produce an electroconductive elastic roller having a definite electric resistance in the intermediate electric-resistance region by intermixing therein an ionically electroconductive substance such as a specific salt exemplified by lithium perchlorate, sodium perchlorate and calcium perchlorate. Nevertheless, such rollers bring about unfavorable situations including much difference in electric resistance between the circumstances of a high temperature and a high humidity such as 32.5° C./85% R.H. and those of a low temperature and a low humidity such as 15° C./10% R.H.; gradual increase in its electric resistance with long-term continuous running under the conditions of electric current passage; and besides the occurrence of poor image in the case of the roller being used for electrophotography. Although the mechanism of the increase in the electric resistance is not necessarily clarified, it is thought that the salt such as lithium perchlorate, sodium perchlorate and calcium perchlorate which is added to the roller for the manifestation of electroconductivity is subjected to dissociation and polarization, whereby electric current is made difficult to pass, and at the same time, the electric resistance is increased thereby.

It has previously been found by the present inventors that a polyurethane material is obtained which has a characteristic volume resistivity in the range of 10MΩ·cm to 1000GΩ·cm and which is stabilized in electric resistance even during a long time of electric current passage by using, as a matrix, a polyurethane foam or a polyurethane elastomer which is produced from any of tolylene diisocyanate, diphenylmethane diisocyanate and crude diphenyl-methane diisocyanate each as a starting raw material and at the same time, by adding thereto a quaternary ammonium salt as an ionically electroconductive substance [refer to Japanese Patent Application Laid-Open No. 113050/1995 (Hei-7)]. However, the above-mentioned material is not necessarily satisfactory because of much difference in the electric resistance between the circumstances of a low temperature and a low humidity such as 15° C./10% R.H. and those of a high temperature and a high humidity such as 32.5° C./85% R.H.

On the other hand, eager and increasing demands have recently been imposed on an electroconductive elastic member to be well suited for use as a packaging member and a shock-absorbing member in which antistatic function is required for the purpose of protecting electronic part items.

SUMMARY OF THE INVENTION

Under such circumstances, the object of the present invention is to provide an electroconductive elastic member in which its characteristic volume resistivity lies in the desired intermediate-electric-resistance region usually in the range of 10MΩ·cm to 1000GΩ·cm, which is lessened not only in positional variance of electric resistance, in dependence of electric resistance upon applied voltage, in variation range of electric resistance at the time of continuous passage of electric current but also in variation of electric resistance due to change in environmental conditions such as temperature and humidity, and which is well suited for an elastic roller having an intermediate electric-resistance to be used in an electrophotographic process as well as a packaging member and a shock-absorbing member wherein antistatic function is required; and besides the object thereof is to provide an electrophotographic apparatus by using said electroconductive elastic member.

As a result of intensive research and investigation accumulated by the present inventors in order to achieve the foregoing object, it has been found that the object can be attained by the use of an electroconductive material as an electroconductive elastic member, which material comprises a polyurethane foam or a polyurethane elastomer which is produced from a specific polyol component or a specific polyisocyanate component; and at the same time an electroconductivity imparting agent comprising a quaternary ammonium salt and further that said electroconductive elastic member is preferably usable as a developing roller or a transfer roller in an electrophotographic apparatus. The present invention has been accomplished by the foregoing findings and information.

That is to say, the present invention provides:

(1) an electroconductive elastic member (hereinafter referred to as "electroconductive elastic member 1") which comprises an electroconductive material for use therein comprising (A) a polyurethane foam or a polyurethane elastomer produced by using a polyester polyol as a polyol component; and a (B) electroconductivity imparting agent comprising a quaternary ammonium salt;

(2) an electroconductive elastic member (hereinafter referred to as "electroconductive elastic member 2") which comprises an electroconductive material for use therein comprising (A') a polyurethane foam or a polyurethane elastomer produced by using, as a polyisocyanate component, at least one component selected from the group consisting of hydrogenated products from diphenylmethane diisocyanate and hexamethylene diisocyanate; and a (B) electroconductivity imparting agent comprising a quaternary ammonium salt;

(3) an electroconductive elastic member (hereinafter referred to as "electroconductive elastic member 3") which comprises an electroconductive material for use therein comprising (A") a polyurethane foam or a polyurethane elastomer produced by using, as a polyisocyanate component, at least one component selected from the group consisting of a carbodiimide-modified diphenylmethane diisocyanate, a glycol-modified diphenylmethane diisocyanate, an isocyanurate-modified diphenylmethane diisocyanate; and a isocyanurate-modified hexamethylene diisocyanate;and a (B) electroconductivity imparting agent comprising a quaternary ammonium salt;

(4) an electrophotographic apparatus (hereinafter referred to as "electrophotographic apparatus 1") which comprises a developing device in which the above-mentioned electroconductive elastic member 1, 2 or 3 being under the condition of supporting a developing agent thereon is brought into contact with or brought close to an image-forming body and is rotated to adhesively bond said developing agent to the surface of said image-forming body and to form a visible image on the surface of said image-forming body; and (5) an electrophotographic apparatus (hereinafter referred to as "electrophotographic apparatus 2") which comprises an image transfer device in which the above-mentioned electroconductive elastic member 1, 2 or 3 is made to electrically charge a recording medium, and thus a developing agent is transferred to the recording medium from the surface of an electrostatic latent image which has been made visible by said developing agent.

DESCRIPTION OF THE PREFERRED EMBODIMENTS

Figure 1:
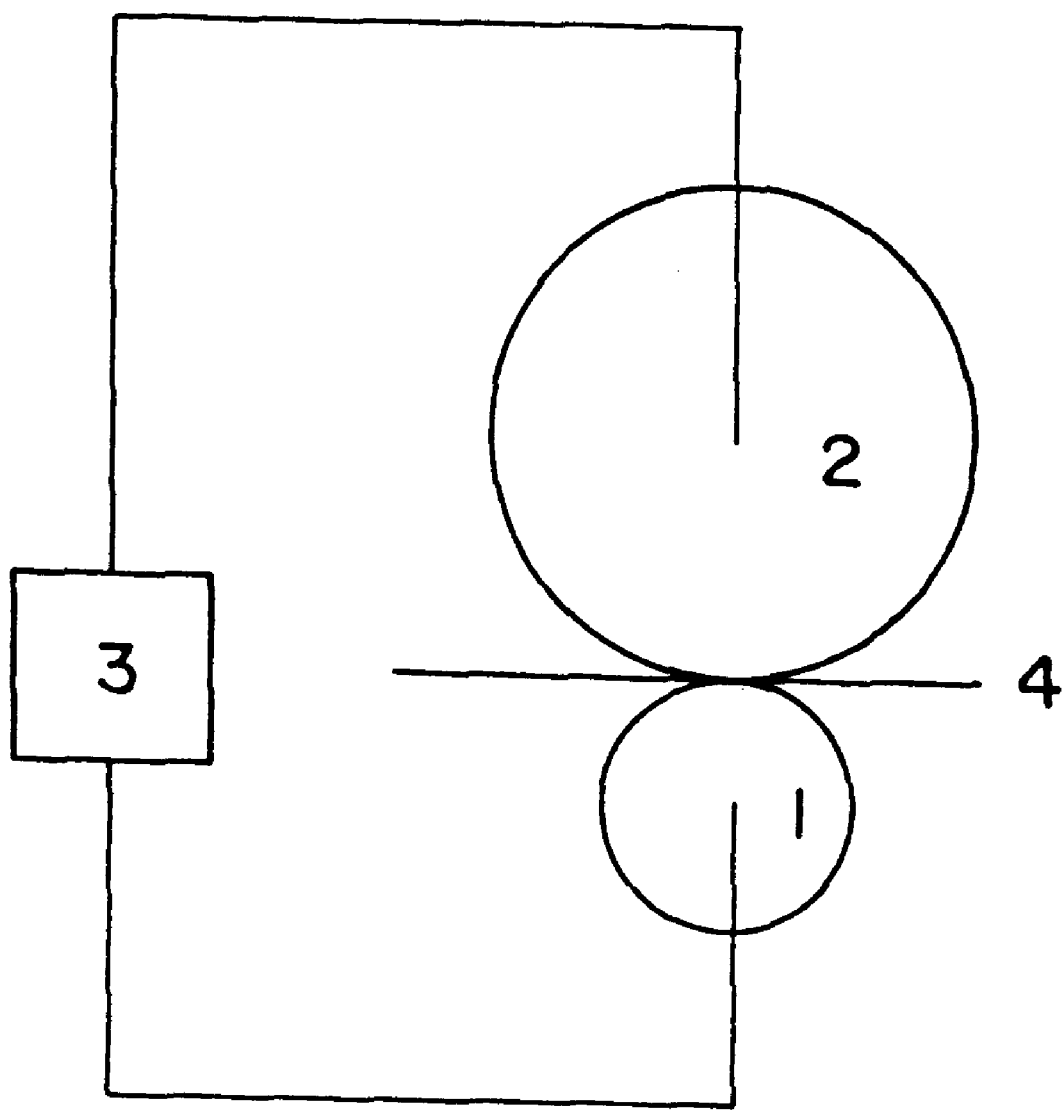
FIG. 1 is an explanatory drawing showing an example of an image transfer device of an electrophotographic copying machine using the electroconductive elastic member according to the present invention in which the symbol 1 is an electroconductive roller; symbol 2 is an image-forming body (photosensitive body); symbol 3 is an electric power source; and symbol 4 is an image transfer material (recording medium).

In the electroconductive material to be used for the electroconductive elastic member (1) according to the present invention, the polyurethane foam or the polyurethane elastomer as the component (A) is obtained by using polyester polyol as a polyol component. This polyester polyol is not specifically limited, but can be arbitrarily selected for use from the well known polyester polyol which has heretofore been used in a polyurethane elastomer, a polyurethane foam and the like. Examples of the polyester polyol include (1) a condensation reaction series polyester polyol which is obtained by the condensation reaction between a dicarboxylic acid such as adipic acid; glutaric acid; succinic acid; sebacic acid; pimelic acid; suberic acid; and phthalic acid, and a diol such as ethylene glycol; diethylene glycol; 1,4-butanediol; 1,6-hexanediol; and propylene glycol or a triol such as trimethylolethane; and trimethylolpropane (2) a lactone series polyester polyol which is obtained by subjecting a lactone such as γ-butyrolactone; δ-valerolactone; and ε-caprolactone to ring-opening polymerization in the presence of a diol such as ethylene glycol; diethylene glycol; 1,4-butanediol; 1,6-hexanediol; and propylene glycol or a triol such as trimethylolethane; and trimethylolpropane, (3) an ester-modified polyol which is obtained by modifying a polyether polyol at a terminal thereof with a lactone such as γ-butyrolactone; δ-valerolactone; and ε-caprolactone. Of these polyester polyols are preferable the polyester polyols each having 2 to 4 functional groups in a molecule and having a number-average molecular weight of 200 to 5000. By using such polyester polyol as a polyol component, it is made possible to lessen the variation in the electric resistance of the electroconductive elastic member to be formed, especially the variation in the electric resistance thereof between the circumstances of a high temperature and a high humidity such as 32.5° C./85% R.H. and the circumstances of a low temperature and a low humidity such as 15° C./10% R.H.

As the polyol component in the electroconductive elastic member 1, the above-described polyester polyol may be used alone or in combination with at least one other species. In addition, a well known polyol other than the foregoing may be used as desired in combination therewith to the extent that the object of the present invention is not impaired. Examples of the well known polyol other than the same include polyether polyols obtained by performing an addition reaction between a polyhydric alcohol such as ethylene glycol, propylene glycol and glycerol and ethylene oxide or propylene oxide; and polyether polyols such as polytetramethylene ether glycol obtained by the ring-opening polymerization of tetrahydrofuran.

In regard to the polyurethane foam or the polyurethane elastomer as the component (A) to be used in the electroconductive elastic member 1, the polyester polyol needs only to be used as the polyol component as mentioned hereinbefore, and the terms and conditions in the production thereof are not specifically limited. Moreover, any of flexible and rigid polyurethane foams may be used, but a flexible polyurethane foam is preferable. The general properties thereof are not specifically limited, but may be suitably selected according to various situations.

The polyisocyanate component for the production of the component (A) by reacting with the above-mentioned polyol component is not specifically limited, but may be optionally selected for use from the well known polyisocyanate which has heretofore been used in the production of polyurethane. Examples of the polyisocyanate component include tolylene diisocyanate, diphenylmethane diisocyanate, crude diphenylmethane diisocyanate, hexamethylene diisocyanate, isophoroe diisocyanate, a modified product thereof and a hydrogenated product therefrom. The polyisocyanate component may be used alone or in combination with at least one other.

On the other hand, a chain extender which is usually employed in the production of polyurethane is exemplified by a short-chain diol such as ethylene glycol; propylene glycol; and 1,4-butanediol and a short-chain diamine such as ethylenediamine, tetramethylenediamine and hexamethylenediamine. Any of the chain extenders may be used alone or in combination with at least one other.

In the electroconductive material to be used for the electroconductive elastic member (2) according to the present invention, the polyurethane foam or the polyurethane elastomer as the component (A') is obtained by the use of a hydrogenated product from diphenylmethane diisocyanate (hydrogenated MDI) or hexamethylene diisocyanate (HDI). The aforesaid hydrogenated MDI may be any of a hydrogenated product from ordinary diphenylmethane-diisocyanate, i.e. MDI (dicyclohexylmethane-4,4'-diisocyanate) and a hydrogenated product from crude diphenylmethane-diisocyanate (crude MDI). By using such diisocyanate as a polyisocyanate component, it is made possible to lessen the variation in the electric resistance of the electroconductive elastic member to be formed, especially the variation in the electric resistance thereof between the circumstances of a high temperature and a high humidity such as 32.5° C./85% R.H. and the circumstances of a low temperature and a low humidity such as 15° C./10% R.H. The polyisocyanate component may be used alone or in combination with at least one other. In addition, other well known polyisocyanate compounds may be used as desired in combination therewith to the extent that the object of the present invention is not impaired. Examples of the other well known polyisocyanate compounds include tolylene diisocyanate, MDI, crude MDI and isophorone diisocyanate.

In regard to the polyurethane foam or the polyurethane elastomer as the component (A') to be used in the electroconductive elastic member 2, the hydrogenated product from diphenylmethane diisocyanate (hydrogenated MDI) or hexamethylene diisocyanate (HDI) needs only to be used as the polyisocyanate component as mentioned hereinbefore, and the terms and conditions in the production thereof are not specifically limited. Moreover, any of flexible and rigid polyurethane foams may be used, but a flexible polyurethane foam is preferable. The general properties thereof are not specifically limited, but may be suitably selected according to various situations.

The polyol component for the production of the component (A') by reacting with the above-mentioned polyisocyanate component is not specifically limited, but may be suitably selected according to various situations. Polyester polyol and polyether polyol, which are preferably used, are exemplified by (1) a condensation reaction series polyester polyol which is obtained from a diol such as ethylene glycol; diethylene glycol; 1,4-butanediol; 1,6-hexanediol; and propylene glycol or a triol such as trimethylolethane; and trimethylolpropane, and a dicarboxylic acid such as adipic acid; glutaric acid; succinic acid; sebacic acid; pimelic acid; suberic acid and phthalic acid, (2) a lactone series polyester polyol which is obtained by subjecting a lactone such as γ-butyrolactone; δ-valerolactone; and ε-caprolactone or a derivative thereof to ring-opening polymerization in the presence of a diol such as ethylene glycol; diethylene glycol; 1,4-butanediol; 1,6-hexanediol; and propylene glycol or a triol such as trimethylolethane; and trimethylolpropane, (3) an ester-modified polyol which is obtained by modifying a polyether polyol at a terminal thereof with a lactone such as γ-butyrolactone; δ-valerolactone; and ε-caprolactone, (4) polyether polyols obtained by performing an addition reaction between a polyhydric alcohol such as ethylene glycol, propylene glycol and glycerol and ethylene oxide or propylene oxide and (5) polyether polyols such as polytetramethylene ether glycol obtained by the ring-opening polymerization of tetrahydrofuran or a derivative thereof. Of these polyol components are preferable the polyol components having 2 to 4 functional groups in a molecule and having a number-average molecular weight of 200 to 5000. Any of the polyol components may be used alone or in combination with at least one other.

On the other hand, a chain extender which is usually employed in the production of polyurethane is exemplified by those which have been exemplified in the description of the component (A) of the electroconductive elastic member 1.

In the electroconductive material to be used for the electroconductive elastic member (3) according to the present invention, the polyurethane foam or the polyurethane elastomer as the component (A") is obtained by the use of at least one species selected from among ① a carbodiimide-modified diphenylmethane diisocyanate, ② a glycol-modified diphenylmethane diisocyanate (e.g. ethylene glycol-modified diphenylmethane diisocyanate), ③ an isocyanurate-modified diphenylmethane diisocyanate and ④ an isocyanurate-modified hexamethylene diisocyanate. By using such modified diphenylmethane/hexamethylene diisocyanate as a polyisocyanate component, it is made possible to lessen the variation in the electric resistance of the electroconductive elastic member to be formed, especially the variation in the electric resistance thereof between the circumstances of a high temperature and a high humidity such as 32.5° C./85% R.H. and the circumstances of a low temperature and a low humidity such as 15° C./10% R.H.

As the polyisocyanate component in the electroconductive elastic member 3, at least one species selected from among the foregoing ① to ④ modified diphenylmethane diisocyanate and modified hexamethylene diisocyanate needs only to be used, and may be used in combination with an ordinary diphenylmethane diisocyanate, a hydrogenated product therefrom, an other modified diphenylmethane diisocyanate, a modified hexamethylene diisocyanate(e.g. a hexamethylene diisocyanate adduct by trimethylolpropane or the like, a biuret-modified hexamethylene diisocyanate, uretdion hexamethylene diisocyanate and the like), tolylene diisocyanate, isophorone diisocyanate or the like.

In regard to the polyurethane foam or the polyurethane elastomer as the component (A") to be used in the electroconductive elastic member 3, at least one species selected from among the aforesaid ① to b ④ modified diphenylmethane diisocyanate and modified hexamethylene diisocyanate needs only to be used as the polyisocyanate component as mentioned before, and the terms and conditions in the production thereof are not specifically limited. Moreover, any of flexible and rigid polyurethane foams may be used, but a flexible polyurethane foam is preferable. The general properties thereof are not specifically limited, but may be suitably selected according to various situations.

The polol component which is used to produce the component (A") by reacting with the above-mentioned polyisocyanate component is not specifically limited, but may be suitably selected according to various situations. The polyester polyol and polyether polyol, which are preferably used, are exemplified by those which have been exemplified in the description of the component (A') in the foregoing electroconductive elastic member 2.

On the other hand, a chain extender which is usually employed in the production of polyurethane is exemplified by those which have been exemplified in the description of the component (A') of the electroconductive elastic member 2.

The polyurethane foam and the polyurethane elastomer used as the components (A), (A') and (A"), respectively in the electroconductive elastic members 1, 2 and 3, respectively include a crosslinking type polyurethane. The crosslinking of the polyurethane can be carried out by any of various known methods such as allophanate crosslinking and biuret crosslinking.

In the electroconductive material to be used for electroconductive elastic members 1, 2 and 3 according to the present invention, use is made of a quaternary ammonium salt as an electroconductivity imparting agent for the component (B). The quaternary ammonium salt is available from a variety of such salts, and is exemplified by the compound represented by the general formula (I)

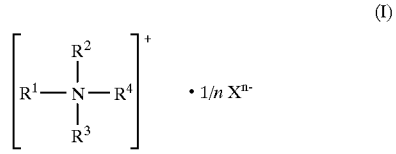

(I)

wherein $R^1$ is an alkyl group having 1 to 30 carbon atoms, an aryl group having 6 to 30 carbon atoms or an aralkyl group having 7 to 30 carbon atoms; $R^2$, $R^3$, and $R^4$ are each independently of one another an alkyl group having 1 to 6 carbon atoms; $X^{n-}$ is an n valent organic acid ion; and n is an integer from 1 to 6.

The alkyl group having 1 to 30 carbon atoms in $R^1$ in the general formula (I) may be of straight chain, branched or cyclic, and is exemplified by methyl group, ethyl group, propyl group, butyl group, hexyl group, octyl group, nonyl group, decyl group, dodecyl group, tetradecyl group, hexadecyl group, octadecyl group, eicosyl group, cyclopentyl group, cyclohexyl group, cyclooctyl group and cyclododecyl group. The aryl group having 6 to 30 carbon atoms in $R^1$ is exemplified by phenyl group and naphthyl group. The aralkyl group having 7 to 30 carbon atoms in $R^1$ is exemplified by benzyl group, phenetyl group and naphthylmethyl group. The above-mentioned aryl group and aralkyl group may have an suitable inactive group introduced onto the carbon ring, including a lower alkyl group, a lower alkoxyl group and a halogen.

The alkyl group having 1 to 6 carbon atoms which is represented by any of $R^2$, $R^3$ and $R^4$ in the general formula (I) may be of straight chain, branched or cyclic, and is exemplified by methyl group, ethyl group, propyl group, butyl group, pentyl group, hexyl group, cyclopentyl group and cyclohexyl group. $R^2$, $R^3$ and $R^4$ may be the same or different from one another.

Examples of $X^{n-}$ include a halogen ion such as $F^-$, $Cl^-$, $Br^-$ and $I^-$; an inorganic acid ion such as $NO_3^-$, $CO_3^{2-}$, $SO_4^{2-}$, $ClO_4^-$ and $BF_4^-$; an organic acid (carboxylic acid) ion such as acetate radical ($CH_3COO^-$), benzoate radical, malonate radical, oxalate radical, tartarate radical, citrate radical malate radical, succinate radical, maleate radical, fumarate radical, phthalate radical, isophthalate radical, terephthalate radical, trimellitate radical, trimesate radical and tricarballylate radical; an alkyl sulfate ion represented by the formula $ROSO_3^-$ (R is an alkyl group having 1 to 10 carbon atoms) which is typified by $CH_3OSO_3^-$, $C_2H_5OSO_3^-$ and the like; and sulfur-containing organic acid ions such as p-toluenesulfonate ions.

Preferably, this $X^{n-}$ is a carboxylate ion or an alkyl sulfate ion in particular.

Examples of the quaternary ammonium salt represented by the general formula (I) include quaternary ammonium halogenides such as tetrabutylammonium chloride, dodecyltrimethylammonium chloride (e.g. lauryltrimethylammonium chloride), hexadecyltrimethylammonium chloride, octadecyltrimethylammonium chloride (e.g. stearyltrimethylammonium chloride); quaternary ammonium salts of alkyl sulfuric acid such as modified aliphatic dimethylethylammonium ethosufate, tetraalkylammonium ethosulfate, lauloylaminopropyldimethylethylammonium ethosulfate; quaternary ammonium salts of carboxylic acid such as benzyltrimethylammonium maleate, benzyltriethylammonium maleate, benzyltrimethylammonium fumarate, benzyltriethylammonium fumarate, benzyltrimethylammonium malonate, benzyltriethylammonium malonate, benzyltrimethylammonium oxalate, benzyltriethylammonium oxalate, benzyltrimethylammonium malate, benzyltriethylammonium malate, benzyltrimethylammonium tartarate, benzyltriethylammonium tartarate, benzyltrimethylammonium citrate, benzyltriethylammonium citrate, benzyltrimethylammonium phthalate, benzyltriethylammonium phthalate, benzyltrimethylammonium isophthalate, benzyltriethylammonium isophthalate, benzyltrimethylammonium terephthalate, benzyltriethylammonium terephthalate, benzyltrimethylammonium trimellitate, benzyltriethylammonium trimellitate, tetramethylammonium maleate, tetrabutylammonium maleate, tetramethylammonium fumarate, tetrabutylammonium fumarate, tetramethylammonium malonate, tetrabutylammonium malonate, tetramethylammonium oxalate, tetrabutylammonium oxalate, tetramethylammonium malate, tetrabutylammonium malate, tetramethylammonium tartarate, tetrabutylammonium tartarate, tetramethylammonium citrate, tetrabutylammonium citrate, tetramethylammonium phthalate, tetrabutylammonium phthalate, tetramethylammonium isophthalate, tetrabutylammonium isophthalate, tetramethylammonium terephthalate, tetrabutylammonium terephthalate, tetramethylammonium trimellitate, tetrabutylammonium trimellitate, di-hardened-beef-tallow alkyldimethylammonium acetate, dodecyltrimethylammonium maleate, hexadecyltrimethylammonium maleate, octadecyltrimethylammonium maleate, modified-aliphatic-dimethylethylammonium maleate, dodecyltrimethylammonium fumarate, hexadecyltrimethylammonium fumarate, octadecyltrimethylammonium fumarate, modified-aliphatic-dimethylethylammonium fumarate, dodecyltrimethylammonium malonate, hexadecyltrimethylammonium malonate, octadecyltrimethylammonium malonate, modified-aliphatic-dimethylethylammonium malonate, dodecyltrimethylammonium oxalate, hexadecyltrimethylammonium oxalate, octadecyltrimethylammonium oxalate, modified-aliphatic-dimethylethylammonium oxalate, dodecyltrimethylammonium malate, hexadecyltrimethylammonium malate, octadecyltrimethylammonium malate, modified-aliphatic-dimethylethylammonium malate, dodecyltrimethylammonium tartarate, hexadecyltrimethylammonium tartarate, octadecyltrimethylammonium tartarate, modified-aliphatic-dimethylethylammonium tartarate, dodecyltrimethylammonium citrate, hexadecyltrimethylammonium citrate, octadecyltrimethylammonium citrate, modified-aliphatic-dimethylethylammonium citrate, dodecyltrimethylammonium phthalate, hexadecyltrimethylammonium phthalate, octadecyltrimethylammonium phthalate, modified-aliphatic-dimethylethylammonium phthalate, dodecyltrimethylammonium isophthalate, hexadecyltrimethylammonium isophthalate, octadecyltrimethylammonium isophthalate, modified-aliphatic-dimethylethylammonium isophthalate, dodecyltrimethylammonium terephthalate, hexadecyltrimethylammonium terephthalate, octadecyltrimethylammonium terephthalate, modified-aliphatic-dimethylethylammonium terephthalate, dodecyltrimethylammonium trimellitate, hexadecyltrimethylammonium trimellitate, octadecyltrimethylammonium trimellitate, modified-aliphatic-dimethylethylammonium trimellitate, tetraethylammonium perchlorate, tetrabutylammonium perchlorate, tetraethylammonium borofluoride and tetrabutylammonium borofluoride.

Of these quaternary ammonium salts are preferable the quaternary ammonium salt of an alkyl sulfuric acid and the quaternary ammonium salt of a carboxylic acid from the viewpoint of the favorably stabilized electric-resistance against environmental variation as well as the favorably stabilized electric-resistance at the time of continuous electric current passage.

The quaternary ammonium salt may be used alone or in combination with at least one other species. The blending amount thereof is not specifically limited, but may be suitably selected according to various situations. For example, the amount thereof is preferably 0.001 to 5, more preferably 0.01 to 1 part by weight per 100 parts by weight of the polyurethane foam or the polyurethane elastomer as the above-mentioned components (A), (A') and (A'') in order that the characteristic volume resistivity of the resultant electroconductive material falls within an intermediate region, especially in the range of $1\times10^6$ to $1\times10^{11}\Omega$ at an applied voltage of 1000V.

There is no limitation in the method for blending the quaternary ammonium salt in the polyurethane foam or the polyurethane elastomer as the above-mentioned components (A), (A') and (A''). It is advantageous to add said salt to the reaction system at the time of producing the polyurethane foam or the polyurethane elastomer as the components (A), (A') and (A''). In this case, the salt may be added in the form of the quaternary ammonium salt or separately as a quaternary ammonium hydroxide and as a carboxylic acid. In the case of adding in the form of quaternary ammonium salt or quaternary ammonium hydroxide, it is possible, prior to the addition, to dissolve the same in a solvent such as an ether, an alcohol, an ester, a lactone and a carbonate.

The quaternary ammonium salt as the component (B) may be incorporated as desired, with a conventionally used electroconductivity imparting agent such as an inorganic acid salt exemplified by sodium perchlorate, potassium perchlorae and calcium perchlorate and an electroconductive filler exemplified by carbon black, metal powder and metal oxide powder to the extent that the object of the present invention is not impaired thereby.

The process for producing the electroconductive material to be used in the present invention may follow a conventional process without specific limitation, and will be exemplified in the following.

In the first place, a uniform mixture is prepared by the use of the foregoing polyisocyanate component, the polyol component, a chain extender, the quaternary ammonium salt, and additives other than the foregoing to be used as desired such as an electroconductivity imparting agent, a catalyst, a reinforcing agent, a colorant and a foam regulating agent, and thereafter the resultant mixture is reacted and cured by heating so as to produce an electroconductive material wherein the quaternary ammonium salt as the electroconductivity imparting agent is incorporated in the polyurethane elastomer. The electroconductive material can be produced by a process in which the polyol component is made into the form of an isocyanate by the use of the polyisocyanate component, and the resultant isocyanate is uniformly mixed with a chain extender, the quaternary ammonium salt, and additives other than the foregoing to be used as desired such as an electroconductivity imparting agent, a catalyst, a reinforcing agent, a colorant and a foam regulating agent, and thereafter the resultant mixture is reacted and cured by heating so as to produce the objective electroconductive material.

In addition, an electroconductive material is obtained in which an electroconductivity imparting agent is contained in the polyurethane foam by foaming the polyisocyanate component at the time of heating for reaction and cure by a conventional well known method. It is preferable that the electroconductive material to be obtained according to the present invention be in the form of a foam.

The foaming method is not specifically limited, but may be selected for use from various methods including a method using a foaming agent, a method by intermixing bubble by mechanical agitation, etc. The expansion ratio may be suitably determined without specific limitation.

The polyurethane foam or the polyurethane elastomer may be crosslinked as desired, for the purpose of enhancing its heat resistance, chemical resistance, mechanical strength and the like.

The electroconductive material is made to possess a desirable characteristic-volume-resistivity by prescribed production conditions, and is characterized in that its characteristic volume resistivity usually falls within the range of $1\times10^6$ to $1\times10^{11}\Omega$ at an applied voltage of 1000V. Furthermore, the electroconductive material thus obtained is minimized in positional variance of electric resistance, in dependence of electric resistance upon applied voltage, in variation of electric resistance at the time of continuous electric current passage, and at the same time, in variation of electric resistance due to change in environmental conditions such as temperature and humidity.

The electroconductive elastic members 1, 2 and 3 exhibit a stable electric-resistance in an intermediate electric-resistance region, especially in the range of $1M\Omega$ to $100G\Omega$, and is preferably used as an electroconductive member for electrophotography, specifically an image transfer roller, a developing roller and the like in an electrophotographic apparatus.

The process for producing the electroconductive elastic member according to the present invention is not specifically limited, but may follow any of various well known processes. The aforesaid electroconductive elastic member which exhibits stabilized electric-resistance in an intermediate electric-resistance region of from 1MΩ to 100 GΩ, is produced, for example, by coating a plated steel or a stainless-steel made core metal with the foregoing electroconductive material, and depending upon the purpose of use, further coating the outside thereof with an electroconductive, semi-electroconductive, or insulating coating-material The shape of the electroconductive elastic member according to the present invention is not specifically limited, but may be determined according to the purpose of use. It is exemplified by the form of roller, plate, square block, sphere, brush or the like, and is usually in the form of roller or plate.

The present invention further provides electrophotographic apparatuses 1 and 2 using the electroconductive elastic members 1, 2 and 3 according to the present invention. The electrophotographic apparatus 1 comprises a developing device in which the electroconductive elastic member 1, 2 or 3 being under the condition of supporting a developing agent thereon is brought into contact with or brought close to an image-forming body and is rotated to adhesively bond said developing agent to the surface of said image-forming body and to form a visible image on the surface of said image-forming body.

On the other hand, the electrophotographic apparatus 2 comprises an image transfer device in which the electroconductive elastic member 1, 2 or 3 is made to electrically charge a recording medium, and thus a developing agent is transferred to the recording medium from the surface of an electrostatic latent image which has been made visible by said developing agent.

In the following, some description will be given of an example using the electroconductive elastic member according to the present invention as an image transfer roller for an electrophotographic copying machine.

FIG. 1 is an explanatory drawing showing an example of an image transfer apparatus for an electrophotographic copying machine using the electroconductive elastic member according to the present invention. An electroconductive roller (image transfer roller) 1 which is equipped with a core metal (not shown in the drawing) and is composed of the electroconductive elastic member according to the present invention is made to abut against a toner image carrier 2 such as a photosensitive drum via a transfer material 4 such as a sheet of paper, and an voltage is applied between the electroconductive roller 1 and the toner image carrier 2 from an electric power source 3 to generate an electric field between the toner image carrier 2 and the electroconductive roller 1, whereby a toner on the toner image carrier 2 is transferred onto the transfer material 4.

It is made possible according to the present invention to readily provide an electroconductive elastic member which is lessened in positional variance of electric resistance, in dependence of electric resistance upon applied voltage, in variation range of electric resistance at the time of continuous electric current passage and besides in variation of electric resistance due to change in environmental conditions such as temperature and humidity, and which is well suited for use as an intermediate electric-resistance roller and the like in an electrophotographic process as well as a packaging material and a shock-absorbing material which have antistatic functions.

In the following, the present invention will be described in more detail with reference to comparative examples and working examples, which however, shall not limit the present invention thereto.

EXAMPLE 1

By the use of a mixer, a mixture was prepared by mixing 100 parts by weight of a condensation reaction series polyester polyol which had a number-average molecular weight of 2200, the number of functional groups in one molecule of 2.3 and which had been obtained by the condensation reaction among adipic acid, diethylene glycol and triol (trade name; POLYLITE-OD-X-106, produced by Dainippon Ink and Chemicals, Inc.); 22.6 parts by weight of tolylene diisocyanate; 6.0 parts by weight of 1,4-butanediol; 4.0 parts by weight of a reactive silicone-based surfactant; 0.25 part by weight of dibutyltin dilaurate; and 0.15 part by weight of a modified-aliphatic-dimethylethylammonium ethosulfate $[H(CH_2)_{4-20}—C_2H_5N(CH_3)_2C_2H_5OSO_3$, molecular weight of 466 to 550]. By using the resultant mixture, an image transfer roller having a diameter of 16.5 mm and a length of 215 mm was produced in which a metallic shaft (core) with a diameter of 6 mm was placed in the center and longitudinally covered with polyurethane foam (expansion ratio of 1.2) and the electroconductive material had a characteristic volume resistivity of $1.60 \times 10^9$ Ω·cm at an applied voltage of 1000 V.

Subsequently, the image transfer roller was placed on an aluminum plate with a thickness of 5 mm, and a measurement was made of the electric resistance of the polyurethane foam between the metallic core and a copper plate of a resistance measuring instrument at an applied voltage of 1000 V, while both the ends of the image transfer roller were compressed at a force of 500 g, respectively. The relation between the electric resistance and the temperature/humidity is given in the following.

| temperature/humidity (° C./% R.H.) | electric resistance (Ω) |
| --- | --- |
| 15/10 | $3.80 \times 10^9$ |
| 20/50 | $2.28 \times 10^8$ |
| 32.5/85 | $2.09 \times 10^7$ |

Further, the image transfer roller was incorporated in an image transfer apparatus of an image forming apparatus (electrophotographic copying machine) as shown in FIG. 1. Thus the image transfer apparatus was made to print a grey scale, a black solid with 100 dot percent and white solid with zero dot percent under the environmental conditions of 15° C. and 10% R.H. As a result, favorable images were obtained. In addition, the image forming apparatus was made to print a grey scale, a black solid with 100 dot percent and white solid with zero dot percent under the environmental conditions of 32.5° C. and 85% R.H. As a result, favorable images were obtained.

Subsequently, the photosensitive body of the image transfer roller was replaced with an aluminum raw tube, and the image transfer roller was continuously rotated for 150 hours under the environmental conditions of 25° C. and 50% R.H., while a voltage of 1000V was applied thereto throughout the rotation. Then, a measurement was made of the electric resistance of the polyurethane foam in the same manner as the foregoing. As a result, the electric resistance of the polyurethane foam was $3.60 \times 10^8$Ω at 20° C./50% R.H., $2.51 \times 10^7$Ω at 32.50° C./85% R.H., and $1.12 \times 10^{10}$Ω at 15° C. 10% R.H.

Thereafter, the image transfer roller was incorporated in the image transfer apparatus in the same manner as before, and the apparatus was made to print a grey scale, a black solid with 100 dot percent and white solid with zero dot percent under the environmental conditions of 15° C. and 10% R.H. As a result, favorable images were obtained.

EXAMPLE 2

By the use of a mixer, a mixture was prepared by mixing 100 parts by weight of a lactone series polyester polyol which had a number-average molecular weight of 2000, and the number of functional groups in one molecule of 2; 22.3 parts by weight of tolylene diisocyanate; 6.0 parts by weight of 1,4-butanediol; 4.0 parts by weight of a reactive silicone-based surfactant; 0.25 part by weight of dibutyltin dilaurate; and 0.15 part by weight of a modified-aliphatic-dimethylethylammonium ethosulfate. By using the resultant mixture, an image transfer roller having a diameter of 16.5 mm and a length of 215 mm was produced in which a metallic shaft (core) with a diameter of 6 mm was placed in the center and longitudinally covered with polyurethane foam (expansion ratio of 1.5) and the electroconductive material had a characteristic volume resistivity of $8.10 \times 10^{10}$ Ω·cm at an applied voltage of 1000 V.

Subsequently, the image transfer roller was placed on an aluminum plate with a thickness of 5 mm, and a measurement was made of the electric resistance of the polyurethane foam between the metallic core and a copper plate of a resistance measuring instrument at an applied voltage of 1000 V, while both the ends of the image transfer roller were compressed at a force of 500 g, respectively. The relation between the electric resistance and the temperature/humidity is given in the following.

| temperature/humidity (° C./% R.H.) | electric resistance (Ω) |
|---|---|
| 15/10 | $7.14 \times 10^{10}$ |
| 20/50 | $8.51 \times 10^9$ |
| 32.5/85 | $4.14 \times 10^8$ |

Further, the image transfer roller was incorporated in an image transfer apparatus of an image forming apparatus as shown in FIG. 1. Thus the image transfer apparatus was made to print a grey scale, a black solid with 100 dot percent and white solid with zero dot percent under the environmental conditions of 15° C. and 10% R.H. As a result, favorable images were obtained. In addition, the image forming apparatus was made to print a grey scale, a black solid with 100 dot percent and white solid with zero dot percent under the environmental conditions of 32.5° C. and 85% R.H. As a result, favorable images were obtained.

Subsequently, the photosensitive body of the image transfer roller was replaced with an aluminum raw tube, and the image transfer roller was continuously rotated for 150 hours under the environmental conditions of 25° C. and 50% R.H., while a voltage of 1000V was applied thereto throughout the rotation. Then, a measurement was made of the electric resistance of the polyurethane foam in the same manner as the foregoing. As a result, the electric resistance of the polyurethane foam was $1.34 \times 10^{10}$ Ω at 20° C./50% R.H., $4.97 \times 10^8$ Ω at 32.5° C./85% R.H., and $2.11 \times 10^{11}$ Ω at 15° C./10% R.H.

Thereafter, the image transfer roller was incorporated in the image transfer apparatus in the same manner as before, and the apparatus was made to print a grey scale, a black solid with 100 dot percent and white solid with zero dot percent under the environmental conditions of 15° C. and 10% R.H. As a result, favorable images were obtained.

EXAMPLE 3

By the use of a mixer, a mixture was prepared by mixing 100 parts by weight of an ester-modified polyether polyol in which a polyether polyol had been modified with lactone at a terminal thereof and which had a number-average molecular weight of 4000, and the number of functional groups in one molecule of 3; 20 parts by weight of tolylene diisocyanate; 6.0 parts by weight of 1,4-butanediol; 4.0 parts by weight of a reactive silicone-based surfactant; 0.06 part by weight of dibutyltin dilaurate; and 0.15 part by weight of a modified-aliphatic-dimethylethylammonium ethosulfate. By using the resultant mixture, an image transfer roller having a diameter of 16.5 mm and a length of 215 mm was produced in which a metallic shaft (core) with a diameter of 6 mm was placed in the center and longitudinally covered with polyurethane foam (expansion ratio of 1.5) and the electroconductive material had a characteristic volume resistivity of $9.60 \times 10^9$ Ω·cm at an applied voltage of 1000 V.

Subsequently, the image transfer roller was placed on an aluminum plate with a thickness of 5 mm, and a measurement was made of the electric resistance of the polyurethane foam between the metallic core and a copper plate of a resistance measuring instrument at an applied voltage of 1000 V, while both the ends of the image transfer roller were compressed at a force of 500 g, respectively. The relation between the electric resistance and the temperature/humidity is given in the following.

| temperature/humidity (° C./% R.H.) | electric resistance (Ω) |
|---|---|
| 15/10 | $2.54 \times 10^{10}$ |
| 20/50 | $1.31 \times 10^9$ |
| 32.5/85 | $8.23 \times 10^7$ |

Further, the image transfer roller was incorporated in an image transfer apparatus as shown in FIG. 1. Thus the image transfer apparatus was made to print a grey scale, a black solid with 100 dot percent and white solid with zero dot percent under the environmental conditions of 15° C. and 10% R.H. As a result, favorable images were obtained. In addition, the image transfer apparatus was made to print a grey scale, a black solid with 100 dot percent and white solid with zero dot percent under the environmental conditions of 32.5° C. and 85% R.H. As a result, favorable images were obtained.

Subsequently, the photosensitive body of the image transfer roller was replaced with an aluminum raw tube, and the image transfer roller was continuously rotated for 150 hours under the environmental conditions of 25° C. and 50% R.H., while a voltage of 1000V was applied thereto throughout the rotation. Then, a measurement was made of the electric resistance of the polyurethane foam in the same manner as the foregoing. As a result, the electric resistance of the polyurethane foam was $2.07 \times 10^9$ Ω at 20° C./50% R.H., $9.88 \times 10^7$ Ω at 32.5° C./85% R.H., and $7.49 \times 10^{10}$ Ω at 15° C./10% R.H.

Thereafter, the image transfer roller was incorporated in the image transfer apparatus in the same manner as before, and the apparatus was made to print a grey scale, a black solid with 100 dot percent and white solid with zero dot percent under the environmental conditions of 15° C. and 10% R.H. As a result, favorable images were obtained.

EXAMPLE 4

By the use of a mixer, a mixture was prepared by mixing 100 parts by weight of a polyether polyol which had a number-average molecular weight of 3500, the number of functional groups in one molecule of 3 and which had been obtained by subjecting glycerol to addition reaction with propylene oxide and ethylene oxide (the ratio of propylene oxide to ethylene oxide being 88:12); 30.6 parts by weight of hydrogenated MDI; 6.0 parts by weight of 1,4-butanediol; 4.0 parts by weight of a reactive silicone-based surfactant; 0.2 part by weight of dibutyltin dilaurate; and 0.15 part by weight of a modified-aliphatic-dimethylethylammonium ethosulfate [$H(CH_2)_{4-20}C_2H_5N(CH_3)_2C_2H_5OSO_3$, molecular weight of 466 to 550]. By using the resultant mixture, an image transfer roller having a diameter of 16.5 mm and a length of 215 mm was produced in which a metallic shaft (core) with a diameter of 6 mm was placed in the center and longitudinally covered with polyurethane foam (expansion ratio of 1.7) and the electroconductive material had a characteristic volume resistivity of $4.02 \times 10^9$ Ω·cm at an applied voltage of 1000 V.

Subsequently, the image transfer roller was placed on an aluminum plate with a thickness of 5 mm, and a measurement was made of the electric resistance of the polyurethane foam between the metallic core and a copper plate of a resistance measuring instrument at an applied voltage of 1000 V, while both the ends of the image transfer roller were compressed at a force of 500 g, respectively. The relation between the electric resistance and the temperature/humidity is given in the following.

| temperature/humidity (° C./% R.H.) | electric resistance (Ω) |
| --- | --- |
| 15/10 | $4.22 \times 10^9$ |
| 20/50 | $5.52 \times 10^8$ |
| 32.5/85 | $3.09 \times 10^7$ |

Further, the image transfer roller was incorporated in an image transfer apparatus of an image forming apparatus (electrophotographic copying machine) as shown in FIG. 1. Thus the image transfer apparatus was made to print a grey scale, a black solid with 100 dot percent and white solid with zero dot percent under the environmental conditions of 15° C. and 10% R.H. As a result, favorable images were obtained. In addition, the image forming apparatus was made to print a grey scale, a black solid with 100% dot percent and white solid with zero dot percent under the environmental conditions of 32.5° C. and 85% R.H. As a result, favorable images were obtained.

Subsequently, the photosensitive body of the image transfer roller was replaced with an aluminum raw tube, and the image transfer roller was continuously rotated for 150 hours under the environmental conditions of 25° C. and 50% R.H., while a voltage of 1000V was applied thereto throughout the rotation. Then, a measurement was made of the electric resistance of the polyurethane foam in the same manner as the foregoing. As a result, the electric resistance of the polyurethane foam was $8.75 \times 10^8$ Ω at 20° C./50% R.H., $3.72 \times 10^7$ Ω at 32.5° C./85% R.H., and $1.30 \times 10^{10}$ Ω at 15° C./10% R.H.

Thereafter, the image transfer roller was incorporated in the image transfer apparatus in the same manner as before, and the apparatus was made to print a grey scale, a black solid with 100 dot percent and white solid with zero dot percent under the environmental conditions of 15° C. and 10% R.H. As a result, favorable images were obtained.

EXAMPLE 5

By the use of a mixer, a mixture was prepared by mixing 100 parts by weight of a polyether polyol which had a number-average molecular weight of 3500, the number of functional groups in one molecule of 3 and which had been obtained by subjecting glycerol to addition reaction with propylene oxide and ethylene oxide(the ratio of propylene oxide to ethylene oxide being 88:12); 19.5 parts by weight of HDI; 6.0 parts by weight of 1,4-butanediol; 4.0 parts by weight of a reactive silicone-based surfactant; 0.1 part by weight of dibutyltin dilaurate; and 0.15 part by weight of a modified-aliphatic-dimethylethylammonium ethosulfate. By using the resultant mixture, an image transfer roller having a diameter of 16.5 mm and a length of 215 mm was produced in which a metallic shaft (core) with a diameter 6 mm was placed in the center and longitudinally covered with polyurethane foam (expansion ratio of 1.4) and the electroconductive material had a characteristic volume resistivity of $6.03 \times 10^8$ Ω·cm at an applied voltage of 1000 V.

Subsequently, the image transfer roller was placed on an aluminum plate with a thickness of 5 mm, and a measurement was made of the electric resistance of the polyurethane foam between the metallic core and a copper plate of a resistance measuring instrument at an applied voltage of 1000 V, while both the ends of the image transfer roller were compressed at a force of 500 g, respectively. The relation between the electric resistance and the temperature/humidity is given in the following.

| temperature/humidity (° C./% R.H.) | electric resistance (Ω) |
| --- | --- |
| 15/10 | $9.81 \times 10^8$ |
| 20/50 | $8.22 \times 10^7$ |
| 32.5/85 | $5.68 \times 10^6$ |

Further, the image transfer roller was incorporated in an image transfer apparatus of an image forming apparatus as shown in FIG. 1. Thus the image transfer apparatus was made to print a grey scale, a black solid with 100 dot percent and white solid with zero dot percent under the environmental conditions of 15° C. and 10% R.H. As a result, favorable images were obtained. In addition, the image transfer apparatus was made to print a grey scale, a black solid with 100 dot percent and white solid with zero dot percent under the environmental conditions of 32.5° C. and 85% R.H. As a result, favorable images were obtained.

Subsequently, the photosensitive body of the image transfer roller was replaced with an aluminum raw tube, and the image transfer roller was continuously rotated for 150 hours under the environmental conditions of 25° C. and 50% R.H., while a voltage of 1000V was applied thereto throughout the rotation. Then, a measurement was made of the electric resistance of the polyurethane foam in the same manner as the foregoing. As a result, the electric resistance of the polyurethane foam was $1.30 \times 10^8$ Ω at 20° C./50% R.H., $6.83 \times 10^6$ Ω at 32.5° C./85% R.H., and $2.90 \times 10^9$ Ω at 15° C./10% R.H.

Thereafter, the image transfer roller was incorporated in the image transfer apparatus in the same manner as before, and the apparatus was made to print a grey scale, a black solid with 100 dot percent and white solid with zero dot percent under the environmental conditions of 15° C. and 10% R.H. As a result, favorable images were obtained.

Comparative Example 1

By the use of a mixer, a mixture was prepared by mixing 100 parts by weight of a polyether polyol which had a number-average molecular weight of 3000, the number of functional groups in one molecule of 3, a primary OH ratio of 50%, and which had been obtained by subjecting glycerol to addition reaction with propylene oxide and ethylene oxide (the ratio of propylene oxide to ethylene oxide being 93:7); 20.9 parts by weight of tolylene diisocyanate; 6.0 parts by weight of 1,4-butanediol; 4.0 parts by weight of a reactive silicone-based surfactant; 0.06 part by weight of dibutyltin dilaurate; and 0.15 part by weight of a modified-aliphatic-dimethylethylammonium ethosulfate. By using the resultant mixture, an image transfer roller having a diameter of 16.5 mm and a length of 215 mm was produced in which a metallic shaft (core) with a diameter of 6 mm was placed in the center and longitudinally covered with polyurethane foam (expansion ratio of 1.9) and the electroconductive material had a characteristic volume resistivity of $1.81 \times 10^{10}$ Ω·cm at an applied voltage of 1000 V. Subsequently, the image transfer roller was placed on an aluminum plate with a thickness of 5 mm, and a measurement was made of the electric resistance of the polyurethane foam between the metallic core and a copper plate of a resistance measuring instrument at an applied voltage of 1000 V, while both the ends of the image transfer roller were compressed at a force of 500 g, respectively. The relation between the electric resistance and the temperature/humidity is given in the following.

| temperature/humidity (° C./% R.H.) | electric resistance (Ω) |
|---|---|
| 15/10 | $6.53 \times 10^{10}$ |
| 20/50 | $2.34 \times 10^{9}$ |
| 32.5/85 | $9.27 \times 10^{7}$ |

Further, the image transfer roller was incorporated in a image transfer apparatus as shown in FIG. 1. Thus the image transfer apparatus was made to print a grey scale, a black solid with 100 dot percent and white solid with zero dot percent under the environmental conditions of 15° C. and 10% R.H. As a result, favorable images were obtained. Moreover, the image transfer apparatus was made to print a grey scale, a black solid with 100 dot percent and white solid with zero dot percent under the environmental conditions of 32.5° C. and 85% R.H. As a result, favorable images were obtained.

Subsequently, the photosensitive body of the image transfer roller was replaced with an aluminum raw tube, and the image transfer roller was continuously rotated for 150 hours under the environmental conditions of 20° C. and 50% R.H., while a voltage of 1000V was applied thereto throughout the rotation. Then, a measurement was made of the electric resistance of the polyurethane foam in the same manner as the foregoing. As a result, the electric resistance of the polyurethane foam was $3.71 \times 10^{9}$Ω at 20° C./50% R.H., $1.11 \times 10^{8}$Ω at 32.5° C./85% R.H., and $1.93 \times 10^{11}$Ω at 15° C./10% R.H.

Thereafter, the image transfer roller was incorporated in the image transfer apparatus in the same manner as before, and the apparatus was made to print a black solid with 100 dot percent under the environmental conditions of 15° C. and 10% R.H. As a result, there were obtained inferior images in which white lines were observed.

Comparative Example 2

By the use of a mixer, a mixture was prepared by mixing 100 parts by weight of a polyether polyol which had a number-average molecular weight of 5000, the number of functional groups in one molecule of 3, and a primary OH ratio of 75%, and which had been obtained by subjecting glycerol to addition reaction with propylene oxide and ethylene oxide (the molar ratio of propylene oxide to ethylene oxide being 85:15); 18.7 parts by weight of tolylene diisocyanate; 6.0 parts by weight of 1,4-butanediol; 4.0 parts by weight of a reactive silicone-based surfactant; 0.03 part by weight of dibutyltin dilaurate; and 0.15 part by weight of a modified-aliphatic-dimethylethylammonium ethosulfate. By using the resultant mixture, an image transfer roller having a diameter of 16.5 mm and a length of 215 mm was produced in which a metallic shaft (core) with a diameter of 6 mm was placed in the center and longitudinally covered with polyurethane foam (expansion ratio of 1.8) and the electroconductive material had a characteristic volume resistivity of $4.82 \times 10^{9}$ Ω·cm at an applied voltage of 1000 V.

Subsequently, the image transfer roller was placed on an aluminum plate with a thickness of 5 mm, and a measurement was made of the electric resistance of the polyurethane foam between the metallic core and a copper plate of a resistance measuring instrument at an applied voltage of 1000 V, while both the ends of the image transfer roller were compressed at a force of 500 g, respectively. The relation between the electric resistance and the temperature/humidity is given in the following.

| temperature/humidity (° C./% R.H.) | electric resistance (Ω) |
|---|---|
| 15/10 | $2.46 \times 10^{10}$ |
| 20/50 | $7.17 \times 10^{8}$ |
| 32.5/85 | $3.58 \times 10^{7}$ |

Further, the image transfer roller was incorporated in an image transfer apparatus as shown in FIG. 1. Thus the image transfer apparatus was made to print a grey scale, a black solid with 100 dot percent and white solid with zero dot percent under the environmental conditions of 15° C. and 10% R.H. As a result, favorable images were obtained. Moreover, the image transfer apparatus was made to print a grey scale, a black solid with 100 dot percent and white solid with zero dot percent under the environmental conditions of 32.5° C. and 85% R.H. As a result, favorable images were obtained.

Subsequently, the photosensitive body of the image transfer roller was replaced with an aluminum raw tube, and the image transfer roller was continuously rotated for 150 hours under the environmental conditions of 20° C. and 50% R.H., while a voltage of 1000V was applied thereto throughout the rotation. Then, a measurement was made of the electric resistance of the polyurethane foam in the same manner as the foregoing. As a result, the electric resistance of the polyurethane foam was $1.13 \times 10^{9}$Ω at 20° C./50% R.H., $4.30 \times 10^{7}$Ω at 32.5° C./85% R.H., and $7.26 \times 10^{10}$Ω at 15° C./10% R.H.

Thereafter, the image transfer roller was incorporated in the image transfer apparatus in the same manner as before, and the apparatus was made to print a black solid with 100 dot percent under the environmental conditions of 15° C. and 10% R.H. As a result, there were obtained inferior images in which white lines were observed.

The following are the positional variance of electric resistance and the dependence of electric resistance upon voltage for the above-described Examples 1 to 5 and Comparative Examples 1 and 2.

Specifically, the ratio of the electric resistance measured at 500V to the electric resistance measured at 1000V each at 20° C./55% R.H. was at most 1.1, and the ratio of the electric resistance measured at 500V to the electric resistance measured at 1000V each at 15° C./10% R.H. was at most 1.2. Moreover, evaluations were made of the positional variance of the electric resistance at a voltage of 1000V under 15° C./10% R.H. by using a copper plate having a width of 1 cm for 6 points in the longitudinal direction of the roller at a same interval and for 4 points in the circumferential direction at every 90 degrees, thus making a total of 24 points of evaluation. As a result, the maximum value was 1.4 times the minimum value.

EXAMPLE 6

By the use of a mixer, a mixture was prepared by mixing 100 parts by weight of a polyether polyol which had a number-average molecular weight of 5000, the number of functional groups in one molecule of 3, and a primary OH ratio of 75%, and which had been obtained by subjecting glycerol to addition reaction with propylene oxide and ethylene oxide (the molar ratio of propylene oxide to ethylene oxide being 85:15); 16.6 parts by weight of a mixture of diphenylmethane diisocyanate, carbodiimide-modified diphenylmethane diisocyanate and glycol-modified diphenylmethane diisocyanate; 4.0 parts by weight of a reactive silicone-based surfactant; 0.01 part by weight of dibutyltin dilaurate; and 0.3 part by weight of benzyltrimethylammonium oxalate. By using the resultant mixture, an image transfer roller having a diameter of 16.5 mm and a length of 215 mm was produced in which a metallic shaft (core) with a diameter of 6 mm was placed in the center.

Subsequently, the image transfer roller was placed on an aluminum plate with a thickness of 5 mm, and a measurement was made of the electric resistance of the polyurethane foam between the metallic core and a copper plate of a resistance measuring instrument at an applied voltage of 1000 V, while both the ends of the image transfer roller were compressed at a force of 500 g, respectively. The relation between the electric resistance and the temperature/humidity is given in the following.

| temperature/humidity (° C./% R.H.) | electric resistance (Ω) |
|---|---|
| 15/10 | $1.7 \times 10^9$ |
| 20/50 | $2.0 \times 10^8$ |
| 32.5/85 | $5.2 \times 10^7$ |

Further, the image transfer roller was incorporated in an image transfer apparatus of an electrophotographic apparatus (electrophotographic copying machine) as shown in FIG. 1. Thus the image transfer apparatus was made to print a grey scale, a black solid with 100 dot percent and white solid with zero dot percent under the environmental conditions of 15° C. and 10% R.H. As a result, favorable images were obtained. In addition, the image transfer apparatus was made to print a grey scale, a black solid with 100 dot percent and white solid with zero dot percent under the environmental conditions of 32.5° C. and 85% R.H. As a result, favorable images were obtained.

Subsequently, the photosensitive body of the image transfer roller was replaced with an aluminum raw tube, and the image transfer roller was continuously rotated for 150 hours under the environmental conditions of 20° C. and 50% R.H., while a voltage of 1000V was applied thereto throughout the rotation. Then, a measurement was made of the electric resistance of the polyurethane foam in the same manner as the foregoing. As a result, the electric resistance of the polyurethane foam was $2.0 \times 10^8 \Omega$ at 20° C./50% R.H., $4.0 \times 10^7 \Omega$ at 32.5° C./85% R.H., and $4.0 \times 10^9 \Omega$ at 15° C./10% R.H.

Thereafter, the image transfer roller was incorporated in the image transfer apparatus in the same manner as before, and the apparatus was made to print a grey scale, a black solid with 100 dot percent and white solid with zero dot percent under the environmental conditions of 15° C. and 10% R.H. As a result, favorable images were obtained.

Comparative Example 3

The procedure in Example 6 was repeated to carry out an experiment except that 0.05 part by weight of sodium perchlorate was used in place 0.3 part by weight of benzyltrimethylammonium oxalate. The initial electric resistance was $5.8 \times 10^7 \Omega$ at 20° C./50% R.H., $7.2 \times 10^6 \Omega$ at 32.5° C./85% R.H., and $4.0 \times 10^8 \Omega$ at 15° C./10% R.H., and the initial images were favorably evaluated. However, after a continuous electric current passage test in the same manner as in Example 6, the electric resistance was $4.7 \times 10^8 \Omega$ at 20° C./50% R.H., $1.6 \times 10^7 \Omega$ at 32.5° C./85% R.H., and $1.1 \times 10^{10} \Omega$ at 15° C./10% R.H. The image transfer apparatus was made to print a black solid with 100 dot percent under the environmental conditions of 15° C. and 10% R.H. As a result, there were obtained inferior images in which white lines were observed.

EXAMPLE 7

The procedure in Example 6 was repeated to carry out an experiment except that 0.03 part by weight of a modified-aliphtic-dimethylethylammonium ethosulfate was used in place of 0.3 part by weight of benzyltrimethylammonium oxalate. The initial electric resistance was $6.8 \times 10^7 \Omega$ at 20° C./50% R.H., $1.0 \times 10^7 \Omega$ at 32.5° C./85% R.H., and $5.0 \times 10^8 \Omega$ at 15° C./10% R.H., and the initial images were favorably evaluated. Moreover, after a continuous electric current passage test in the same manner as in Example 6, the electric resistance was $2.0 \times 10^8 \Omega$ at 20° C./ 50% R.H., $1.0 \times 10^7 \Omega$ at 32.5° C./85% R.H., and $5.0 \times 10^9 \Omega$ at 15° C./10% R.H., and favorable images were obtained.

EXAMPLE 8

The procedure in Example 6 was repeated to carry out an experiment except that 14.5 parts by weight of a carbodiimide-modified diphenylmethane diisocyanate as an isocyanate component was used in place of 16.6 parts by weight of a mixture of diphenylmethane diisocyanate, carbodiimide-modified diphenylmethane diisocyanate and glycol-modified diphenylmethane diisocyanate. The initial electric resistance was $1.5 \times 10^8 \Omega$ at 20° C./50% R.H., $5.0 \times 10^7 \Omega$ at 32.5° C./85% R.H., and $1.5 \times 10^9 \Omega$ at 15° C./10% R.H., and the initial images were favorably evaluated. Moreover, after a continuous electric current passage test in the same manner as in Example 6, the electric resistance was $1.5 \times 10^8 \Omega$ at 20° C./50% R.H., $4.0 \times 10^7 \Omega$ at 32.5° C./85% R.H., and $3.0 \times 10^9 \Omega$ at 15° C./10% R.H., and favorable images were obtained.

Comparative Example 4

The procedure in Example 7 was repeated to carry out an experiment except that 8.7 parts by weight of tolylene diisocyanate as an isocyanate component was used in place of 16.6 parts by weight of a mixture of diphenylmethane diisocyanate, carbodiimide-modified diphenylmethane diisocyanate and glycol-modified diphenylmethan ediisocyanate. The initial electric resistance was $5.0 \times 10^7 \Omega$ at 20° C./50% R.H., $2.2 \times 10^6 \Omega$ at 32.5° C./85% R.H., and $8.0 \times 10^8 \Omega$ at 15° C./10% R.H. The image transfer apparatus was made to print a black solid with 100 dot percent under the environmental conditions of 32.5° C. and 85% R.H. As a result, there were obtained inferior images in which toner spreading was observed on the periphery.

EXAMPLE 9

By the use of a mixer, a mixture was prepared by mixing, with bubble intermixing, 60 parts by weight of a polyether polyol which had a number-average molecular weight of 5000 and which had been obtained by subjecting glycerol to random addition reaction with propylene oxide and ethylene oxide; 40 parts by weight of polytetramethylene glycol having a number-average molecular weight of 3000, 15 parts by weight of isocyanurate-modified hexamethylene diisocyanate, 4.0 parts by weight of a reactive silicone-based surfactant; 0.1 part by weight of dibutyltin dilaurate; and 0.8 part by weight of benzyltrimethylammonium oxalate. By using the resultant mixture, a polyurethane foam-made electroconductive roller having a diameter of 16.7 mm and a length of 215 mm was produced by casting the mixture in a mold in which a metallic shaft (core) with a diameter of 6 mm was placed in the center; curing the mixture at 100° C. for 5 hours; taking out the cured product; and polishing the same.

Subsequently, the electroconductive roller was placed on an aluminum plate with a thickness of 5 mm, and a measurement was made of the electric resistance of the polyurethane foam between the metallic core and a copper plate of a resistance measuring instrument at an applied voltage of 1000 V, while both the ends of the roller were compressed at a force of 500 g, respectively. The relation between the electric resistance and the temperature/humidity is given in the following.

| temperature/humidity (° C./% R.H.) | electric resistance (Ω) |
|---|---|
| 15/10 | $10^{8.76}$ |
| 20/50 | $10^{8.20}$ |
| 32.5/85 | $10^{7.78}$ |

Further, the electroconductive roller to be tested as an image transfer roller was incorporated in a laser printer available on the market and was made to print a grey scale, a black solid with 100 dot percent and white solid with zero dot percent under the environmental conditions of 15° C. and 10% R.H. As a result, favorable images were obtained. In addition, the electroconductive roller was made to print a grey scale, a black solid with 100 dot percent and white solid with zero dot percent under the environmental conditions of 32.5° C. and 85% R.H. As a result, favorable images were also obtained.

Subsequently, the photosensitive body of the laser printer was replaced with an aluminum raw tube, and the electroconductive roller was continuously rotated for 150 hours under the environmental conditions of 20° C. and 50% R.H., while a voltage of 1000V was applied thereto throughout the rotation. Then, a measurement was made of the electric resistance of the polyurethane foam in the same manner as the foregoing. As a result, the electric resistance of the polyurethane foam was $10^{8.99}$Ω at 15° C./10% R.H., $10^{8.14}$Ω at 20° C./50% R.H. and $10^{7.28}$Ω at 32.5° C./85% R.H.

Thereafter, the electroconductive roller was incorporated in the laser printer in the same manner as before, and the roller was made to print a grey scale, a black solid with 100 dot percent and white solid with zero dot percent under the environmental conditions of 15° C. and 10% R.H. As a result, favorable images were also obtained.

In the electroconductive roller, there were obtained a difference in logarithmic electric-resistance value at 15° C./10% R.H.(low temperature/low humidity condition between the initial condition and the condition after 150 hours of electric current passage at 1000V, and also a difference in logarithmic electric-resistance value at 32.5° C./85% R.H. (high temperature/high humidity condition) between the initial condition and the condition after 150 hours of electric current passage at 1000V. Then, a calculation was made of the difference between the maximum difference in logarithmic electric-resistance value and the minimum logarithmic electric-resistance value each obtained as stated hereinbefore. The result was 1.76.

Subsequently, evaluations were made of the positional variance of the electric resistance by using a copper plate having a width of 1 cm for 6 points in the longitudinal direction of the roller at a same interval and for 4 points in the circumferential direction at every 90 degrees, thus making a total of 24 points of evaluation, while both the ends of the roller was compressed at a force of 500 g and a measurement was made of the electric resistance between the core and the copper plate at 1000V and 20° C./55% R.H. The positional variance of the electric resistance was 0.14 expressed in terms of the logarithmic difference between the position showing a maximum resistance and the position showing a minimum resistance. When the electroconductive roller was allowed to stand for 72 hours at 20° C., no abnormality was observed. Further, no abnormality was observed when the electroconductive roller was allowed to stand for 150 hours at 35° C. in an atmosphere of ozone in 6 ppm concentration and also when it was allowed to stand for 3 hours at 105° C./100% R.H., respectively.

EXAMPLE 10

The procedure in Example 9 was repeated to prepare an electroconductive roller except that 100 parts by weight of a condensation reaction series polyester polyol which had a number-average molecular weight of 2200 and the number of functional groups of 2.3 and which had been produced by the condensation reaction among adipic acid, diethylene glycol and a triol, was used in place of 60 parts by weight of the polyether polyol and 40 parts by weight of the polytetramethylene glycol and that the amount of the isocyanurate-modified hexamethylene diisocyanate was altered to 21 parts by weight.

Subsequently, a measurement was made of the electric resistance of the electroconductive roller in the same manner as in Example 9. The relation between the electric resistance and the temperature/humidity is given in the following.

| temperature/humidity (° C./% R.H.) | electric resistance (Ω) |
|---|---|
| 15/10 | $10^{8.62}$ |
| 20/50 | $10^{7.97}$ |
| 32.5/85 | $10^{7.56}$ |

Further, the electroconductive roller to be tested as an image transfer roller was incorporated in a laser printer available on the market and was made to print a grey scale, a black solid with 100 dot percent and white solid with zero dot percent under the environmental conditions of 15° C. and 10% R.H. As a result, favorable images were obtained. In addition, the electroconductive roller was made to print a grey scale, a black solid with 100 dot percent and white solid with zero dot percent under the environmental conditions of 32.5° C. and 85% R.H. As a result, favorable images were also obtained.

Subsequently, the photosensitive body of the laser printer was replaced with an aluminum raw tube, and the electroconductive roller was continuously rotated for 150 hours under the environmental conditions of 20° C. and 50% R.H., while a voltage of 1000V was applied thereto throughout the rotation. Then, a measurement was made of the electric resistance of the electroconductive roller in the same manner as the foregoing. As a result, the electric resistance thereof was $10^{8.81}\Omega$ at 15° C. 10% R.H., $10^{7.87}\Omega$ at 20° C./50% R.H. and $10^{7.15}\Omega$ at 32.5° C./85% R.H.

Thereafter, the electroconductive roller was incorporated in the laser printer in the same manner as before, and the roller was made to print a grey scale, a black solid with 100 dot percent and white solid with zero dot percent under the environmental conditions of 15° C. and 10% R.H. As a result, favorable images were also obtained.

In the electroconductive roller, there were obtained an difference in logarithmic electric-resistance value at 15° C./10% R.H. (low temperature/low humidity condition) between the initial condition and the condition after 150 hours of electric current passage at 1000V, and also a difference in logarithmic electric-resistance value at 32.5° C./85% R.H. (high temperature/high humidity condition) between the initial condition and the condition after 150 hours of electric current passage at 1000V. Then, a calculation was made of the difference between the maximum difference in logarithmic electric-resistance value and the minimum logarithmic electric-resistance value each obtained as stated hereinbefore. The result was 1.66.

Subsequently, evaluations were made of the positional variance of the electric resistance in the same manner as in Example 9. The positional variance of the electric resistance was 0.15 expressed in terms of the logarithmic difference between the position showing a maximum resistance and the position showing a minimum resistance. When the electroconductive roller was allowed to stand for 72 hours at 20° C., no abnormality was observed. Further, no abnormality was observed when the electroconductive roller was allowed to stand for 150 hours at 35° C. in an atmosphere of ozone in 6 ppm concentration. When the electroconductive roller was allowed to stand for 3 hours at 105° C./100% R.H., deformation and unevenness were observed on the surface of the roller.

What is claimed is:

1. An electroconductive elastic member which comprises an electroconductive material for use therein comprising (A') a polyurethane foam or a polyurethane elastomer produced by using, as a polyisocyanate component, at least one component selected from the group consisting of hydrogenated products from diphenylmethane diisocyanate and hexamethylene diisocyanate and a (B) electroconductivity imparting agent comprising a quaternary ammonium salt.

2. The electroconductive elastic member according to claim 1, wherein the polyol component of (A') the polyurethane foam or the polyurethane elastomer is at least one component selected from the group consisting of polyester polyol and polyether polyol.

3. The electroconductive elastic member according to claim 1, wherein the quaternary ammonium salt as the component (B) is at least one member selected from the group consisting of a quaternary ammonium salt of an alkylsulfuric acid and a quaternary ammonium salt of a carboxylic acid.

4. The electroconductive elastic member according to claim 1, wherein the electroconductive material comprises 100 parts by weight of the component (A') and 0.001 to 5 parts by weight of the component (B).

5. The electroconductive elastic member according to claim 1, wherein the electroconductive material is in the form of foam.

6. An electrophotographic apparatus which comprises a developing device in which the electroconductive elastic member as set forth in claim 1 being under the condition of supporting a developing agent thereon is brought into contact with or brought close to an image-forming body and is rotated to adhesively bond said developing agent to the surface of said image-forming body and to form a visible image on the surface of said image-forming body.

7. An electrophotographic apparatus which comprises an image transfer device in which the electroconductive elastic member as set forth in claim 1 is made to electrically charge a recording medium, and thus a developing agent is transferred to the recording medium from the surface of an electrostatic latent image which has been made visible by said developing agent.

8. An electroconductive elastic member which comprises an electroconductive material for use therein comprising (A") a polyurethane foam or a polyurethane elastomer produced by using, as a polyisocyanate component, at least one component selected from the group consisting of a carbodiimide-modified diphenylmethane diisocyanate, a glycol-modified diphenylmethane diisocyanate, an isocyanurate-modified diphenylmethane diisocyanate and an isocyanurate-modified hexamethylene diisocyanate and a (B) electroconductivity imparting agent comprising a quaternary ammonium salt.

9. The electroconductive elastic member according to claim 8, wherein the polyol component of (A") the polyurethane foam or the polyurethane elastomer is at least one component selected from the group consisting of polyester polyol and polyether polyol.

10. The electroconductive elastic member according to claim 8, wherein the quaternary ammonium salt as the component (B) is at least one member selected from the group consisting of a quaternary ammonium salt of an alkylsulfuric acid and a quaternary ammonium salt of a carboxylic acid.

11. The electroconductive elastic member according to claim 8, wherein the electroconductive material comprises 100 parts by weight of the component (A") and 0.001 to 5 parts by weight of the component (B).

12. The electroconductive elastic member according to claim 8, wherein the electroconductive material is in the form of foam.

13. An electrophotographic apparatus which comprises a developing device in which the electroconductive elastic member as set forth in claim 8 being under the condition of supporting a developing agent thereon is brought into contact with or brought close to an image-forming body and is rotated to adhesively bond said developing agent to the surface of said image-forming body and to form a visible image on the surface of said image-forming body.

14. An electrophotographic apparatus which comprises an image transfer device in which the electroconductive elastic member as set forth in claim 8 is made to electrically charge a recording medium, and thus a developing agent is transferred to the recording medium from the surface of an electrostatic latent image which has been made visible by said developing agent.

* * * * *